No. 697,986. Patented Apr. 22, 1902.
H. H. CUTLER.
CONTROLLER FOR ELECTRIC VEHICLES.
(Application filed Aug. 24, 1899.)
(No Model.)
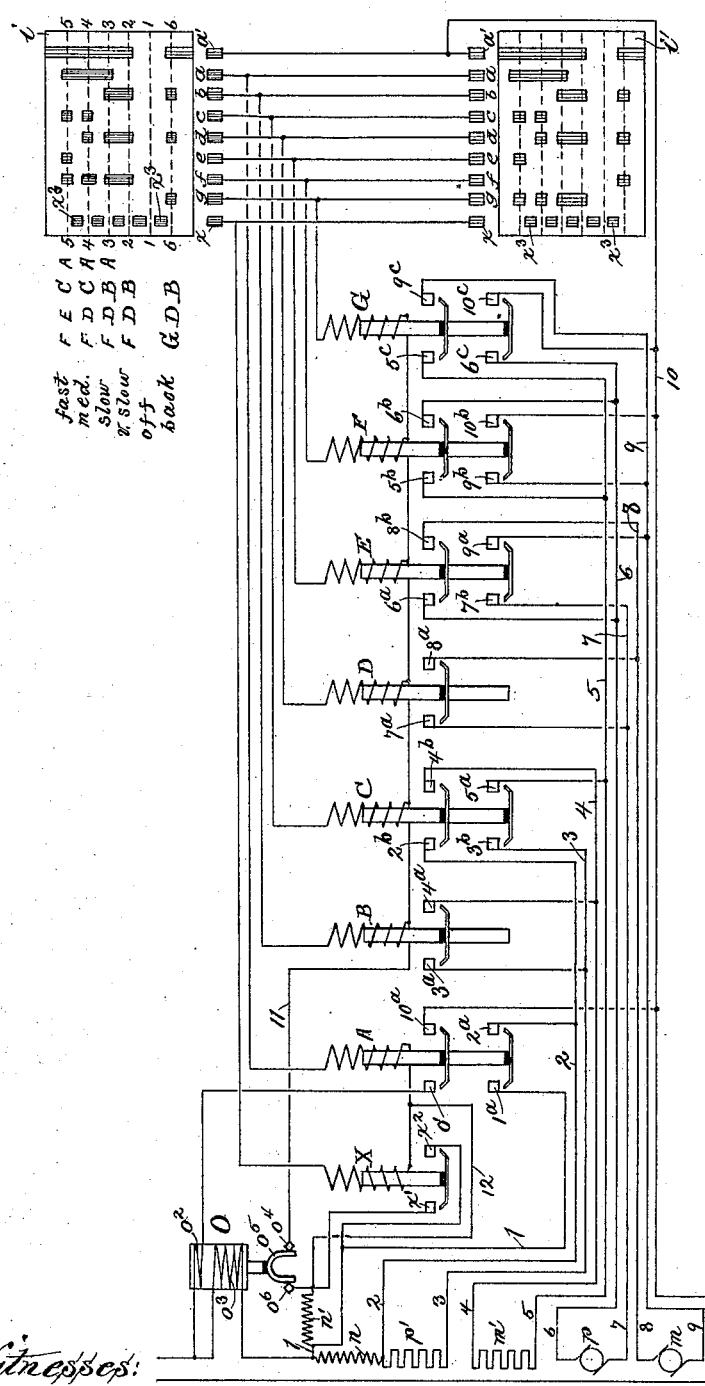

UNITED STATES PATENT OFFICE.

HENRY H. CUTLER, OF CHICAGO, ILLINOIS.

CONTROLLER FOR ELECTRIC VEHICLES.

SPECIFICATION forming part of Letters Patent No. 697,986, dated April 22, 1902.

Application filed August 24, 1899. Serial No. 728,264. (No model.)

*To all whom it may concern:*

Be it known that I, HENRY H. CUTLER, a citizen of the United States, residing at Chicago, in the county of Cook and State of Illinois, have invented a certain new and useful Improvement in Controllers for Electric Vehicles, of which the following is a full, clear, concise, and exact description, reference being had to the accompanying drawing, forming a part of this specification.

My invention relates to a controller for electric vehicles.

In an application filed by me August 24, 1899, Serial No. 728,266, I have illustrated and described a controller wherein a plurality of solenoids are provided adapted to be energized in a prearranged manner by means of switching apparatus, such as a controller-roller, the solenoids controlling contacts which connect the elements of the electric motors or other source of power in varying relations to secure the desired operation. In the specific form of apparatus illustrated in said application for describing the generic principle I have shown the solenoids each provided with a main and auxiliary winding, the auxiliary winding of the solenoid being connected in circuit after the solenoid has attracted its core, to thereby cut down the strength of the current flowing therethrough, the auxiliary winding serving to introduce resistance into the circuit and, moreover, adding to the magnetism of the solenoid, whereby a much less current may be employed for maintaining the core in position than was required for attracting the core in the first instance.

The present invention relates to a modification or improvement of the apparatus specifically illustrated in said application, and in accordance with the present invention I provide but a single winding upon each solenoid and associate with the solenoids a master-solenoid which serves to cut down the strength of the current flowing through the solenoids after the same have performed their work in raising the cores thereof.

I have illustrated my invention in the accompanying drawing, which shows a diagram illustrating the essential features of my invention.

For the purpose of illustrating my invention I have assumed a system, such as is frequently employed in connection with electrical vehicles, in which two motors are used adapted to be connected in series and parallel arrangements to secure the varying conditions of operation. My invention is equally applicable to a different number of motors and is likewise applicable to the control of other sources of power, the solenoids serving in each instance to control the contacts of the several elements of the source of power.

A plurality of solenoids A to G are provided, and the ends of said solenoids are connected, respectively, with the brushes $a$ to $g$, one set of brushes being adapted to engage the contact-plate $i$ of a controller-roller which may be situated at the front end of the car or vehicle, while a second set of brushes is adapted to engage the contact-plate $i'$ of a controller-roller situated at the rear of the vehicle. Instead of employing two controller-rollers a single controller-roller may be employed or other form of switching apparatus may be used. The controller-roller is provided with raised surfaces at intervals which engage the brushes to close circuit through the solenoids, as desired. The brushes $a'$, connected by means of conductor 10 with one side of the supply-circuit, are adapted to continuously engage the controller-roller when the motors are in operation, whereby the contact-plates $i$ $i'$ are continuously (during operation) in connection with one side of the circuit. I have illustrated the starting resistance $n$, the armatures $m$ and $p$ of the two motors, and the field-coils $m'$ $p'$ of the motors, and one end of the starting resistance is connected by conductor 1 with contact $1^a$ of solenoid A. The opposite end of resistance $n$ is connected by conductor 2 with contact $2^a$ of solenoid A and contact $2^b$ of solenoid C. The field-winding $p'$ of one of the motors is connected at one end to the starting resistance and at the other end to a conductor 3, which extends to contact $3^a$ of solenoid B and contact $3^b$ of solenoid C. The field-winding $m'$ of the other motor is connected at one end with conductor 4, which extends to contact $4^a$ of solenoid B and contact $4^b$ of solenoid C, while the opposite end of said winding is connected by conductor 5 with contact $5^a$ of solenoid C, contact $5^b$ of solenoid F, and contact $5^c$ of solenoid G. The armature $p$ of the first motor is connected with conductor 6, extending to contact $6^a$ of solenoid E, contact $6^b$ of solenoid F, and contact $6^c$ of solenoid G. The opposite side of the armature is connected by conductor 7 with contact $7^a$ of solenoid D and contact $7^b$ of solenoid E. One end of armature $m$ is connected by conductor 8 with contact $8^a$ of solenoid D and contact $8^b$ of solenoid E, while the other end of the armature is connected with conductor 9, which extends to contact $9^a$ of solenoid E, $9^b$ of solenoid F, and contact $9^c$ of solenoid G. The rail or return conductor is connected with conductor 10, which extends to contact $10^a$ of solenoid A, contact $10^b$ of solenoid F, and contact $10^c$ of solenoid G.

The overload-magnet O has a coarse winding $o^3$, which is connected in series with the working circuit through the motors, and has a fine winding $o^2$, which is connected to the trolley-wire or other side of the supply-circuit and also to contact $o'$ of solenoid A. The end of solenoid A is connected by conductor 12 through resistance $n'$ to the trolley-wire, while the ends of solenoids B to G, inclusive, are connected by conductor 11 through contacts $o^4$ $o^5$ $o^6$, controlled by the core of solenoid O, these contacts being separated when the core is attracted, the contact $o^5$ being carried upon the core of solenoid O and being moved out of engagement with contacts $o^4$ $o^6$ when the solenoid is energized. The solenoids carry contact-plates which serve to bridge together the pairs of contacts when the solenoids are energized and elevate the cores.

The following table gives the connections made by the several solenoids when energized, the numerals indicating the conductors, which are electrically united when the solenoids are energized:

*Table of Connections Made by Solenoids.*

A connects 1 with 2 and fine-winding solenoid O.
B connects 3 with 4.
C connects 2 with 4 and 3 with 5.
D connects 7 with 8.
E connects 6 with 8 and 7 with 9.
F connects 5 with 6 and 9 with 10.
G connects 5 with 9 and 6 with 10.

By reference to this table it will be noted that A by connecting conductors 1 and 2 short-circuits the starting resistance. The solenoid B when energized connects the motor-fields in series. The solenoid C by uniting conductors 2 and 4 and 3 and 5 connects the motor-fields in parallel. Solenoid D connects the motor-armatures in series. Solenoid E connects the armatures in parallel. Solenoid F connects the fields with the armatures and connects the armatures with the rail. Solenoid G accomplishes the same result as solenoid F, except that the armatures are connected in circuit in reversed direction.

The following table of the uses of the solenoids will facilitate the reading of the drawing:

*Uses of the Solenoids.*

A short-circuits starting resistance and connects winding $o^2$ in circuit.
B connects the motor series fields in series.
C connects the motor series fields in parallel.
D connects the motor-armatures in series.
E connects the motor-armatures in parallel.
F connects the motor-armatures for forward speeds.
G connects the motor-armatures for backward speeds.
O opens the motor-circuit when overloaded.

Referring to the diagram of the controller $i$, the horizontal lines indicate the position of the brushes necessary for securing the operation indicated upon the left. Thus in the position 1 1 the vehicle is at rest and the brushes are in the "off" position. In the position 2 2 the brushes are in position for very slow movement, and in this position solenoids F, D, and B are energized, as indicated in the drawing. In the position 3 3 for slow speed the solenoids F, D, B, and A are energized. In the position 4 4 for medium speed the solenoids F, D, C, and A are energized. In the position 5 5 for fast speed the solenoids F, E, C, and A are energized. In the position 6 6 for back speed the solenoids G, D, and B are energized. The solenoids energized by the operation of the rear controller $i'$ are likewise shown at the left of said controller.

In addition to the brushes $a$ to $g$ and $a'$ brushes $x$ $x$ are provided, adapted to engage contact-surfaces on the contact-plates of the controller-rollers, and these brushes $x$ are connected with one end of a solenoid X, which I have termed the "master-solenoid;" the opposite end of this solenoid is connected with conductor 12. A contact-plate carried upon the end of the core of this solenoid is adapted to engage contacts $x'$ $x^2$ and bridge the same together when the solenoid is energized. The contacts $x'$ $x^2$ are connected with opposite ends of resistance $n'$, and when the solenoid is energized the resistance is thus short-circuited. As the resistance $n'$ is in circuit with the solenoids B to G, inclusive, the solenoid X acts to cut the resistance $n'$ into and out of the energizing-circuit of the solenoids. When solenoid X is energized, the resistance $n'$ is removed from circuit and a current of prearranged value is permitted to flow through such solenoids as may be included in circuit by the controller-roller. When solenoid X is deënergized, resistance $n'$ is included in circuit and the current through the solenoids is decreased to a value sufficient to maintain the cores in the raised position. The contact-surfaces $x^3$ $x^3$ of the contact-plates $i$ $i'$ are provided between the positions of rest of the brushes for the various speeds, so that when the controller-roller is being moved from one position to another brush $x$ is included in circuit, thus energizing solenoid X, and when the controller-roller is brought to rest in any operative position the circuit through solenoid X is opened. The resistance $n'$ is therefore included in the solenoid-circuit in the positions of rest of the controller and is excluded from the circuit at intermediate positions. When the controller-roller is moved from a position of rest, brush $x$ engages one of the contact-surfaces $x^3$, thereby energizing solenoid X and removing resistance $n'$ from circuit. The engagement of one of the brushes $a$ to $g$ therefore permits sufficient current to traverse the corresponding solenoid to energize the same, and when the controller-roller reaches the next position of rest brush $x$ will be passed out of engagement with the contact-surface $x^3$ and the resistance $n'$ will be again included in circuit. The master-solenoid X thus serves to control the circuits through the operating-solenoids and decreases the current flowing therethrough after the same have acted upon the cores thereof to raise the same.

The overload magnet or solenoid O acts as follows: Any abnormal increase of current energizes winding $o^3$ of the overload-magnet O, thereby separating contact $o^5$ from contacts $o^4$ $o^6$ and opening the circuit through the solenoid, and permits the same to become deënergized. As the solenoid A is in a separate circuit, the same remains energized to include the auxiliary winding $o^2$ in circuit, which is sufficient to maintain the core of solenoid O raised after the main circuit of winding $o^3$ has been opened.

While I have described my invention in connection with a specific embodiment adapted for operation in connection with electric-railway vehicles, it is equally applicable to other forms of vehicles—such as elevators, cranes, and the like—and is likewise applicable to the control of motors and sources of electrical power generally.

By the term "solenoid" as employed in the claims appended hereto I contemplate any form of electromagnetic motor.

Having described my invention, what I claim as new, and desire to secure by Letters Patent, is—

1. In a controller, the combination with the several elements of the power-supply to be connected in varying relations, of contacts connected therewith, a plurality of solenoids for controlling the several contacts, a switching device for controlling said solenoids and a master-solenoid for controlling the circuits through said several solenoids, substantially as described.

2. In a controller, the combination with the several elements of the power-supply to be connected in varying relations, of contacts connected therewith, a plurality of solenoids for controlling the several contacts, a switching device for closing circuit through the solenoids as desired and a master-solenoid for decreasing the current through the working solenoids after the same have attracted their cores, substantially as described.

3. In a controller, the combination with the several elements of the power-supply to be connected in varying relations, of contacts connected therewith, a plurality of solenoids for opening and closing circuit through the several contacts, a controller-roller and brushes coöperating therewith to close circuit through the respective solenoids, a master-solenoid and a brush associated therewith and adapted to coöperate with the controller-roller to energize the master-solenoid and decrease the current through the other solenoids, substantially as described.

4. In a controller, the combination with the several elements of the power-supply to be connected in varying relations, of contacts connected therewith, a plurality of solenoids for opening and closing circuit through the several contacts, a controller-roller and brushes coöperating therewith to close circuit through the respective solenoids, a master-solenoid, a brush connected therewith and contacts on the controller-roller arranged to engage said brush to close circuit through the master-solenoid while the controller is being moved from one position to another and to disengage said brush when the controller-roller occupies one of the positions of rest thereof, substantially as described.

In witness whereof I have hereunto subscribed my name in the presence of two witnesses.

HENRY H. CUTLER.

Witnesses:
W. CLYDE JONES,
M. R. ROCHFORD.